(12) United States Patent
Nakaji et al.

(10) Patent No.: US 11,230,256 B2
(45) Date of Patent: Jan. 25, 2022

(54) WORK VEHICLE

(71) Applicant: Kubota Corporation, Osaka (JP)

(72) Inventors: Masaru Nakaji, Sakai (JP); Hiromi Takahashi, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 16/885,660

(22) Filed: May 28, 2020

(65) Prior Publication Data

US 2020/0290556 A1    Sep. 17, 2020

Related U.S. Application Data

(62) Division of application No. 16/007,111, filed on Jun. 13, 2018, now Pat. No. 10,710,546.

(30) Foreign Application Priority Data

Sep. 27, 2017  (JP) .............................. JP2017-186232
Sep. 27, 2017  (JP) .............................. JP2017-186233

(51) Int. Cl.
| | |
|---|---|
| *B60K 5/00* | (2006.01) |
| *B60K 17/34* | (2006.01) |
| *B60K 6/08* | (2006.01) |
| *B60R 22/18* | (2006.01) |
| *B60R 22/34* | (2006.01) |

(Continued)

(52) U.S. Cl.
CPC ................ *B60R 22/18* (2013.01); *B60K 5/00* (2013.01); *B60K 6/08* (2013.01); *B60K 17/00* (2013.01); *B60K 17/34* (2013.01); *B60R 22/26* (2013.01); *B60R 22/34* (2013.01); *B60R 2022/1806* (2013.01); *B60Y 2200/141* (2013.01);

(Continued)

(58) Field of Classification Search
CPC . B60K 5/00; B60K 6/08; B60K 17/00; B60K 17/34
See application file for complete search history.

(56) References Cited

U.S. PATENT DOCUMENTS 4,071,009 A  *  1/1978  Kraina ................ B60R 13/0838
                                                  123/198 E
4,183,344 A  *  1/1980  Kirchweger ............ F02B 77/13
                                                   123/195 A (Continued)

FOREIGN PATENT DOCUMENTS

| JP | S51163227 U | 12/1976 |
|---|---|---|
| JP | S5386722 U | 7/1978 |

(Continued)

*Primary Examiner* — Faye M Fleming
(74) *Attorney, Agent, or Firm* — The Webb Law Firm

(57) ABSTRACT

A seatbelt of a work vehicle includes: a first stay provided in correspondence with a first fixing portion of a vehicle body on either one of right/left sides of a seat; a belt reeling portion that reels and stores a belt main body and is attached to the first fixing portion via the first stay; a second stay provided in correspondence with a second fixing portion on the other one of the right/left sides of the seat; and a buckle portion that fixes an insertion fixture extending from the belt reeling portion and is attached to the second fixing portion via the second stay. A first cover member is mounted to the first stay and covers an outward exposed portion of the first stay. A second cover member is mounted to the second stay and covers an outward exposed portion of the second stay.

4 Claims, 14 Drawing Sheets

(51) Int. Cl.
  *B60K 17/00* (2006.01)
  *B60R 22/26* (2006.01)
  *F16H 57/02* (2012.01)
  *F16H 57/027* (2012.01)

(52) U.S. Cl.
  CPC ......... *B60Y 2200/20* (2013.01); *F16H 57/027* (2013.01); *F16H 2057/02056* (2013.01)

(56) References Cited

U.S. PATENT DOCUMENTS

| | | |
|---|---|---|
| 5,332,261 A | 7/1994 | Siepierski |
| 6,168,206 B1 | 1/2001 | Greib et al. |
| 6,581,969 B2 | 6/2003 | Nishide |
| 8,950,782 B2 | 2/2015 | Dobruia et al. |
| 9,045,105 B2 | 6/2015 | Khaitan |
| 2016/0347214 A1 | 12/2016 | Miyazawa et al. |
| 2017/0036717 A1 | 2/2017 | Wakabayashi et al. |
| 2018/0134179 A1 | 5/2018 | Wakabayashi et al. |

FOREIGN PATENT DOCUMENTS

| | | |
|---|---|---|
| JP | S5521875 Y2 | 5/1980 |
| JP | S5614845 Y2 | 4/1981 |
| JP | S5930252 U | 2/1984 |
| JP | H11314556 A | 11/1999 |
| JP | 11350933 A | 12/1999 |
| JP | 2007320335 A | 12/2007 |
| JP | 2014227076 A | 12/2014 |
| JP | 2016215967 A | 12/2016 |
| JP | 2017030606 A | 2/2017 |

\* cited by examiner

WORK VEHICLE

CROSS-REFERENCE TO RELATED APPLICATIONS

This application is a divisional application of U.S. application Ser. No. 16/007,111, filed Jun. 13, 2018, which claims priority to Japanese Patent Application Nos. 2017-186232 and 2017-186233, both filed Sep. 27, 2017, the disclosures of which are hereby incorporated by reference in their entireties.

BACKGROUND OF THE INVENTION

Field of the Invention

The present invention relates to a work vehicle. Examples of the work vehicle include a multipurpose work vehicle (also referred to as a utility vehicle), but there is no limitation to this.

Description of Related Art (1) First Related Art

The seat of a work vehicle is provided with a seatbelt apparatus (simply referred to as a "seatbelt" hereinafter).

This seatbelt includes a belt reeling portion that reels and stores a belt, and a buckle portion that receives insertion of and fixes an insertion fixture that is provided on the belt extending from the belt reeling portion. In a conventional configuration, the belt reeling portion is provided at a position that is above and on the left or right side in the right-left direction of the seat, the insertion fixture is provided at the leading end portion of the belt and at an intermediate portion in the lengthwise direction, and the buckle portion is provided on both side portions in the right-left direction of the seat. Also, the buckle portions provided on the lateral side portions of the seat are fixed by bolt-coupling to a support stay that is obtained by bending a plate member, and the support stay, the coupling bolt, and the like are exposed to the outside. The support stay is coupled to the vehicle body frame, and functions as a vehicle body side fixing portion (e.g., see JP 2016-215967 A and corresponding US 2016/0347214 A1).

In the conventional configuration, the support stay for fixing the buckle portion, the coupling bolt, and the like are exposed to the outside, and therefore there is a risk that a passenger's body will come into contact with the outward exposed edge of the support stay, the protruding portion of the bolt, or the like when putting on the seatbelt, thus giving the passenger a sense of discomfort. Also, in the case where the buckle portion is provided with a detection sensor that detects whether or not the seatbelt is attached properly, there is a risk that an electrical wire connected to the detection sensor will become damaged due to coming into contact with the edge of the support stay, the protruding portion of the bolt, or the like.

In view of this, there is desire for the ability to support the seatbelt in a manner of preventing disadvantages such as the passenger feeling a sense of discomfort and an electrical wire or the like becoming damaged.

(2) Second Related Art

A work vehicle includes an engine, a flywheel that is integrally-rotatably coupled to a crankshaft of the engine, a starter that starts up the engine, and a transmission case that receives motive power from the crankshaft, and there are cases where the starter is covered by a starter case.

The starter for starting up the engine includes an electric motor that drives a drive pinion gear, and this pinion gear is provided so as to be capable of extending from and retracting into the starter case with use of an actuator such as a solenoid, so as to be switched between a protruding state for starting the engine, in which the pinion gear is meshed with a driven gear integrally-rotatably provided on the crankshaft of the engine, and a retracted state of not being meshed with the driven gear.

In the starter, the intrusion of moisture is a cause for a malfunction of the electric motor or the like, and therefore the starter case needs to cover the starter in a substantially airtight state, but in order for the extension/retraction operation of the pinion gear to be performed smoothly, an air bleeding tube is provided so as to put the space inside the starter case into communication with the outside space in a state where there is little risk of moisture intrusion.

Also, conventionally, the air bleeding tube is provided extending from the starter in a substantially horizontal orientation, a space with a laterally outward side covered by a covering plate is formed on a lateral side of the engine, and the outside air opening portion of the air bleeding tube is open to the inside of that space (e.g., see JP 11-350933A).

With the above conventional configuration, it is possible for the covering plate to prevent the intrusion of rainwater, moisture flying from the laterally outward direction, and the like. However, with a work vehicle used for farm work or the like, there are cases where washing is performed to remove waste such as mud that is attached to the vehicle body, and when water is forcefully sprayed in this washing, there is a risk of the water intruding into the starter through the air bleeding tube.

In view of this, there is desire for a work vehicle that has little risk of water intruding into and negatively influencing the starter.

SUMMARY OF THE INVENTION (1) A work vehicle such as the following is proposed in light of the first related art.

A work vehicle comprising:
 a vehicle body having a driver portion, the vehicle body further having a first fixing portion and a second fixing portion;
 a seat provided in the driver portion;
 a seatbelt apparatus configured to protect a passenger seated on the seat, the seatbelt apparatus including:
  a belt main body, an insertion fixture being provided in a leading end portion of the belt main body,
  a first stay provided in correspondence with the first fixing portion on one lateral side of the seat,
  a belt reeling portion configured to reel and store the belt main body, the belt reeling portion being attached to the first fixing portion via the first stay,
  a second stay provided in correspondence with the second fixing portion on the other lateral side of the seat, and
  a buckle portion configured to fix the insertion fixture extending from the belt reeling portion, the buckle portion being attached to the second fixing portion via the second stay;
 a first cover member configured to cover an outward exposed portion of the first stay, the first cover member being mounted to the first stay; and
 a second cover member configured to cover an outward exposed portion of the second stay, the second cover member being mounted to the second stay.

According to this configuration, the attachment stay for attaching the belt reeling portion to a vehicle body side fixing portion and the attachment stay for attaching the buckle portion to a vehicle body side fixing portion are fixed to the vehicle body side fixing portions with use of coupling bolts or the like, and the cover members are mounted to cover the outward exposed portions of these stays.

The attachment stays and the coupling bolts or the like are covered by the cover members, and the cover members have a smooth outer surface, and therefore a passenger seated on the seat will not feel discomfort even if their hand or the like comes into contact with the cover member when putting on the seatbelt, and even if an electrical wire or the like is located in the vicinity, there is little risk of the electrical wire or the like becoming damaged.

Accordingly, it is possible to support the seatbelt in a manner of preventing disadvantages such as the passenger feeling a sense of discomfort and an electrical wire or the like becoming damaged.

In a preferable aspect, the first stay and the second stay are configured with the same shape, and the first cover member and the second cover member are configured with the same shape.

According to this configuration, the stays on the right/left sides have the same shape, and the cover members have the same shape, thus making it possible to achieve a cost reduction by using common parts, and moreover, parts having the same structure can be used on the right/left sides of the seat during assembly, thus eliminating troubles that occur when using different parts on the right/left sides, and therefore this configuration is advantageous in terms of facilitating the task of cover member assembly.

In a preferable aspect, the first stay is attached and fixed to the first fixing portion with use of a bolt, the second stay is attached and fixed to the second fixing portion with use of a bolt, and each of the first cover member and the second cover member is constituted by an elastic material, includes a cylindrical portion configured to fit around a protruding portion of the bolt, and is held in position by the cylindrical portion and the bolt being press-fitted by elastic force.

According to this configuration, the cover members are held in position by the cylindrical portions provided in the cover members, which are constituted by an elastic material, being press-fitted with the bolts by elastic force. In other words, by using the bolts that are for attachment and fixing of the stays, it is possible to attach the cover members without using special members for attachment. Moreover, the cover members are constituted by an elastic material, and therefore there is little risk of them becoming damaged even if another object comes into contact with them.

In a preferable aspect, a plurality of the seats are provided.

According to this configuration, there are multiple seats, and there is a larger number of attachment stays. Even with this configuration, by using cover members that have the same structure, it is possible to achieve cost reduction and facilitate the assembly task.

(2) A work vehicle such as the following is proposed in light of the second related art.

A work vehicle comprising:
an engine;
a transmission case;
a flywheel case provided between the engine and the transmission case, the flywheel case being configured to cover the flywheel in an airtight manner;
a starter case configured to cover a starter that is configured for starting up the engine;
an air bleeding tube configured to put an interior of the starter case in communication with an outward space; and
a joint connector configured to communicate with an interior space of the flywheel case or the transmission case, the air bleeding tube being communicated with the outward space via the joint connector.

According to this configuration, the air bleeding tube is in communication with the outward space via the joint connector, and therefore the interior space of the starter case and the outward space are in communication via the air bleeding tube, thus making it possible to avoid disadvantages such as heat accumulating in the starter case and the loss of favorable extending and retracting operations of a pinion gear. The joint connector is in communication with the interior space of the flywheel case or transmission case, and therefore even if moisture intrudes through the outer opening portion of the air bleeding tube, that moisture can intrude into and be temporarily stored in the flywheel case or the transmission case, thus making it possible to avoid intrusion into the starter. Also, the amount of moisture that intrudes into the flywheel case or the transmission case is not very large, and instead is very small, and therefore naturally evaporates due to heat generated by engine running or motive power transmission.

The starter is provided at a position in the vicinity of the flywheel, and the flywheel case and the transmission case are arranged at positions in the vicinity of the engine, and therefore the air bleeding tube can be configured with a short tube length, and can have a compact configuration.

Accordingly, it is possible to reduce the risk that moisture intrudes and negatively influences the starter.

In a preferable aspect, the joint connector communicates with the interior space at a lower portion of the flywheel case or the transmission case, and the air bleeding tube includes an outside air opening portion at a position above the engine or the transmission case to communicate with the outward space.

According to this configuration, moisture that intrudes through the outside air opening portion is guided to the interior space of the flywheel case or the transmission case via the air bleeding tube and then the joint connector located on the lower side. The starter is provided at a position higher than the lower portion position of the flywheel where the joint connector is provided, and therefore moisture does not move through the air bleeding tube toward the starter that is at a higher position, and it is possible to avoid the intrusion of moisture into the starter.

In a preferable aspect, a branch tube is connected to the air bleeding tube at a position associated with the outside air opening portion side, and the branch tube extends approximately along a horizontal direction, and the outside air opening portion is formed in each of opposite end portions of the branch tube.

According to this configuration, the outside air opening portion is formed in each of end portions on two sides of the branch tube that extends approximately along the horizontal direction, and therefore if moisture intrudes through either one of the outside air opening portions, the moisture can pass through the horizontal branch tube and be discharged to the outside through the outside air opening portion on the opposite side, and it is possible to further reduce the risk of intrusion toward the starter.

In a preferable aspect, the outside air opening portion is open facing downward.

According to this configuration, the outside air opening portion is open facing downward, and therefore even if water falls thereon from outside the vehicle body, there is little risk that the water will flow into the air bleeding tube through the outside air opening portion. Also, in the case where the outside air opening portion is formed in each of the two end portions of the branch tube, moisture that intrudes through one of the outside air opening portions can be discharged from the outside air opening portion that is on the opposite side and is open facing downward.

(3) Other features and advantages achieved thereby will become apparent from the description given below.

DESCRIPTION OF THE INVENTION

In the following description, the front-rear direction and the right-left direction are defined as follows, unless particularly stated otherwise. Specifically, the direction of an arrow "F" in FIGS. 1 to 3 and 11 to 13 is the "forward" or "front side"; the direction of an arrow "B" in FIGS. 1 to 3 and 11 to 13 is the "backward", "rearward" or "rear side"; the direction of an arrow "R" in FIGS. 2, 3, 12 and 13 is the "right side", and the direction of an arrow "L" in FIGS. 2, 3, 12 and 13 is the "left side".

First Embodiment

A first embodiment of the present invention will be described below with reference to FIGS. 1 to 10. In this embodiment, the present invention is applied to a multipurpose work vehicle, which is one example of a work vehicle.

Overall Configuration

Figure 1:
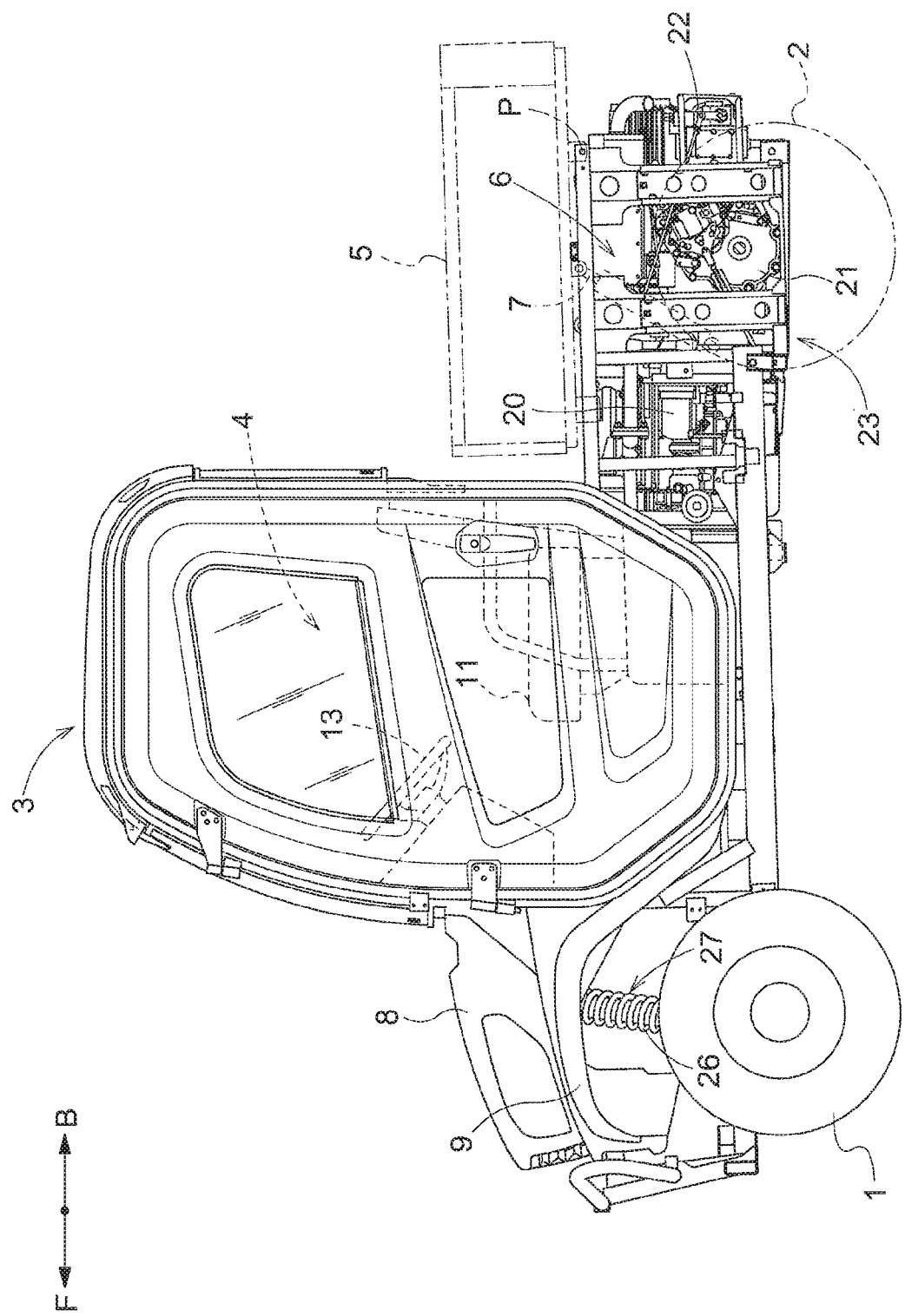
FIG. 1 is a view according to a first embodiment (the same follows up to FIG. 10), showing a lateral side of a multipurpose work vehicle in its entirety.
Figure 2:
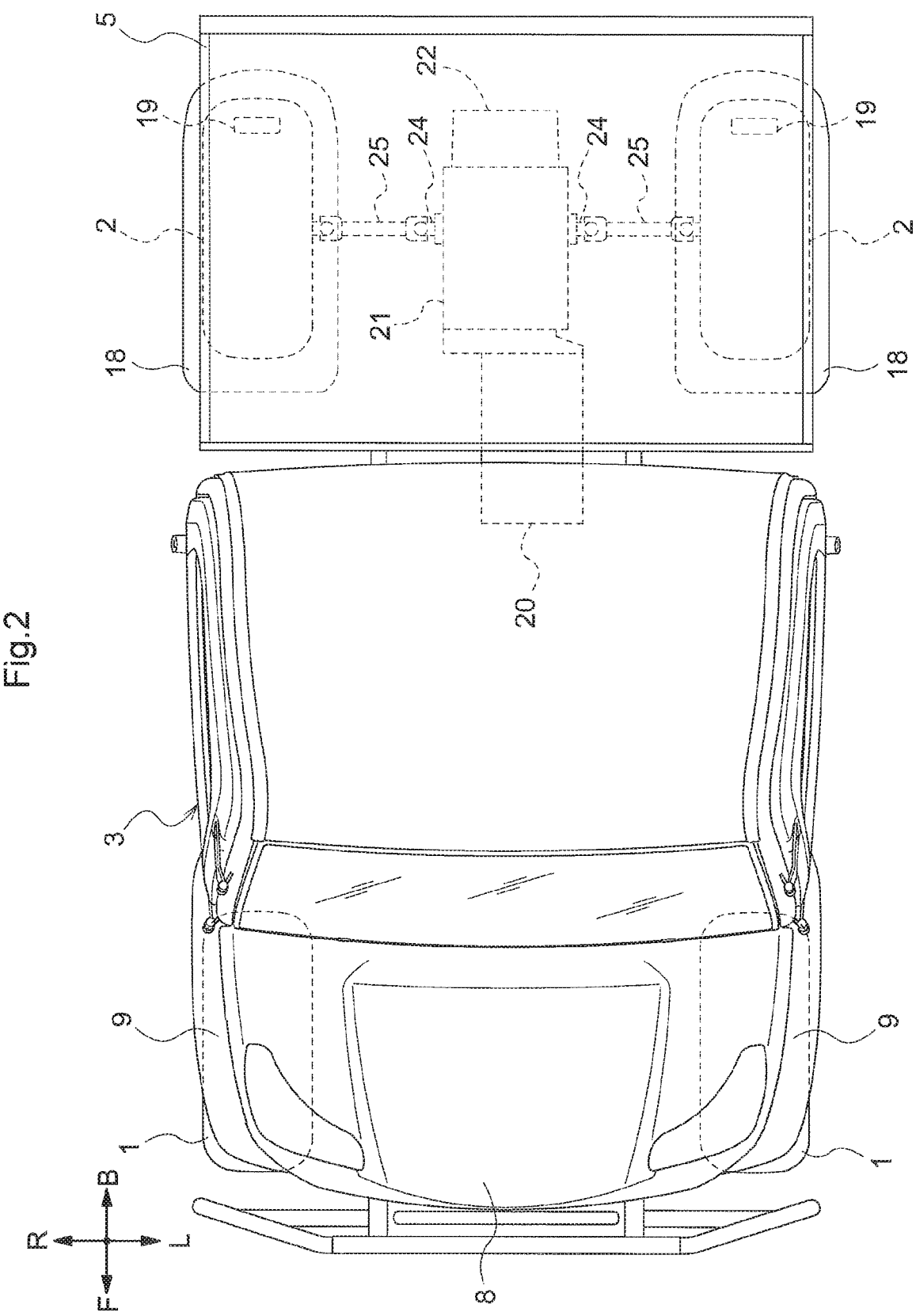
FIG. 2 is an overall plan view of the multipurpose work vehicle.
Figure 3:
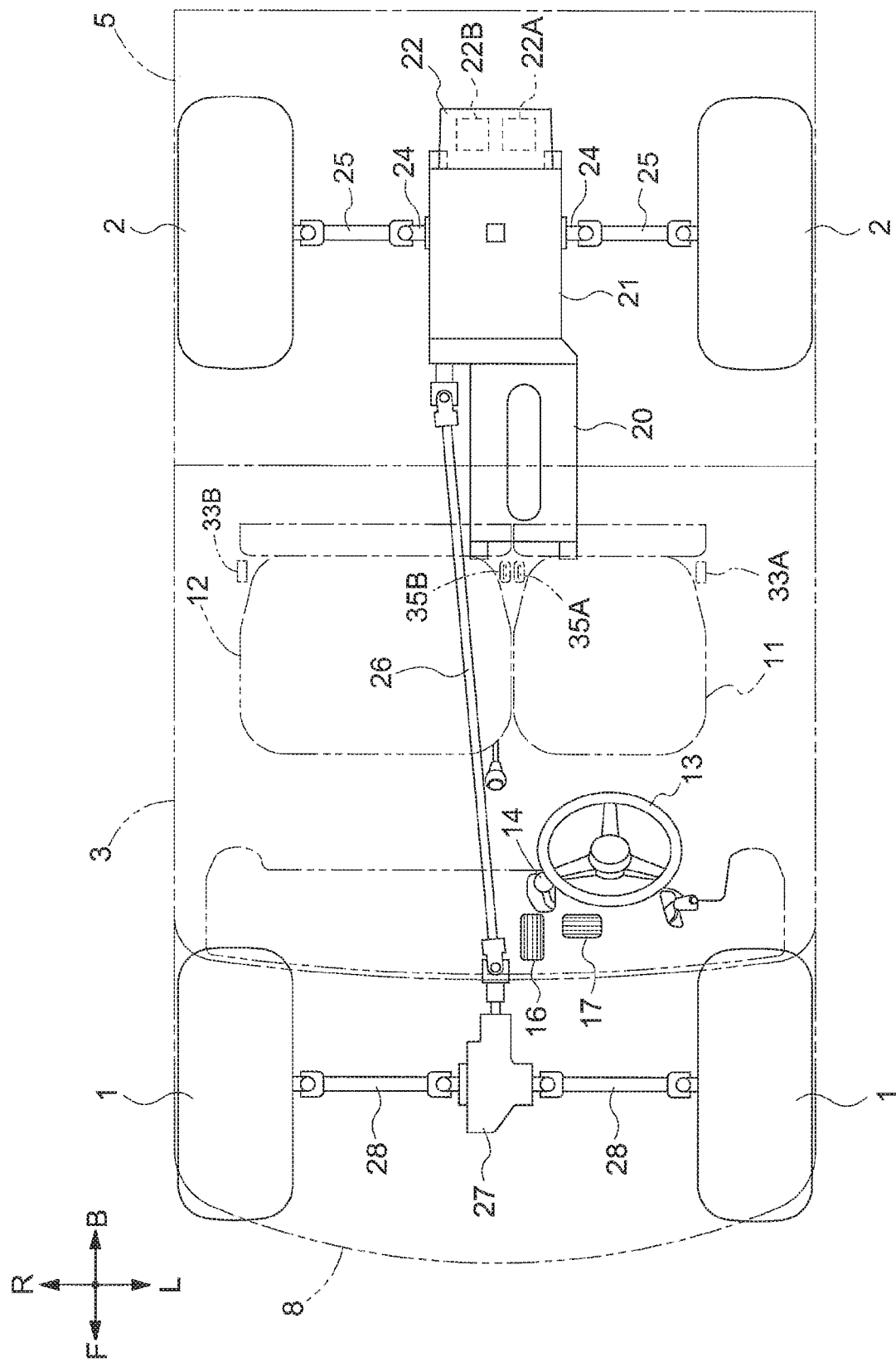
FIG. 3 is a plan view showing a transmission structure of the multipurpose work vehicle.

As shown in FIGS. 1 to 3, the work vehicle has a configuration including a pair of right/left front wheels 1 that are steerable; a pair of right/left rear wheels 2; a driver portion 4 that is located in the front portion of the vehicle body and is covered by a cabin 3; a loading platform 5 that is located in the rear portion of the vehicle body; a drive portion 6 that is located below the loading platform 5, etc.

This work vehicle is a four-wheel drive type of vehicle that has a traveling drive system for transmitting drive power from the drive portion 6 to the front wheels 1 and the rear wheels 2, and is configured as a utility vehicle that can be applied to various uses, such as cargo transport or recreation. The loading platform 5 is supported such that the rear end side is capable of swinging about an axis P that is oriented in the lateral direction at a rear end position of the vehicle body, and has a configuration in which the front end side can be raised by the operation of a dump cylinder 7 so as to discharge a load rearward. A hood 8 that can be opened and closed is provided in the front portion of the vehicle body, and front fenders 9 that cover the upper sides of the front wheels 1 are arranged at lower right/left portions of the hood 8.

The driver portion 4 includes a driver seat 11 (one example of a seat) on which the driver (passenger) sits, and an auxiliary seat 12 (one example of a seat) on which an assistant (passenger) sits, the auxiliary seat 12 being provided adjacent to the driver seat 11 on the right side thereof. Also, a steering wheel 13 for steering and controlling the front wheels 1, a main gearshift lever 14, etc. are provided at a position in front of the driver seat 11. An accelerator pedal 16, which serves as a gear shift operating tool for controlling the travelling speed, and a brake pedal 17, which controls a brake apparatus (not shown) for braking the front wheels 1 and the rear wheels 2, are provided at a position lower than the driver seat 11. Rear fenders 18 are provided at the rear end side of the vehicle body to cover the upper side of the right/left rear wheels 2, and brake lamps 19 are provided in the rear fenders 18.

As shown in FIG. 1, the drive portion 6 has a configuration in which the engine 20, the transmission case 21 and a hydrostatic stepless transmission (HST, which will be referred to as a "stepless transmission" below) 22 are integrally coupled in the stated order. Although described not in detail, the drive portion 6 is installed and supported by a frame-shaped vehicle body frame 23 to prevent or restrict transmission of vibration to the driver portion 4.

Although the internal structure of the transmission case 21 is not shown in the drawings, the transmission case 21 includes a gear-type of transmission apparatus that is configured to shift the drive power, that has been shifted by the stepless transmission 22, to one of multiple gears, and also configured to switch the drive power between the forward travelling power and the rearward travelling power. The transmission case 21 further includes a rear wheel differential mechanism (not shown).

As shown in FIG. 3, the stepless transmission 22 includes an axial plunger type of variable displacement hydraulic pump 22A that is operated by drive power from the engine 20, and an axial plunger type of hydraulic motor 22B that is rotated by hydraulic fluid supplied from the hydraulic pump 22A.

In the drive portion 6, the engine 20 has an output shaft thereof (crankshaft, not shown) oriented along the front-rear direction. The transmission system thereof has a transmission shaft (not shown), coupled to the output shaft, extending through the transmission case 21 in the front-rear direction, whereby the drive power from the engine 20 is transmitted to the hydraulic pump 22A of the stepless transmission 22, and the drive power from the hydraulic motor 22B of the stepless transmission 22 is transmitted to the transmission case 21.

In the transmission case 21, the transmitted drive power is shifted by the transmission apparatus, and the shifted power is transmitted to the right/left rear wheels 2 via the rear wheel differential mechanism, right/left rear output shafts 24 and right/left rear wheel drive shafts 25; and as shown in FIG. 3, the shifted power is transmitted also to the right/left front wheels 1 via a front-to-rear shaft 26, a front wheel differential mechanism 27 and front wheel drive shafts 28.

Seatbelt Apparatus

A seatbelt apparatus 29 (simply referred to as a "seatbelt 29" hereinafter) for protecting a passenger is provided for each of the driver seat 11 and the auxiliary seat 12 included in the driver portion 4.

With reference to FIGS. 4 to 7 as well, each of the seatbelts 29 includes a belt reeling portion 33A/33B located on one side of the seat 11/12 in the right-left direction (lateral outer side in the illustrated embodiment). The seatbelt 29 is attached via a stay 30 (one example of a first stay) to a coupling support portion 36a (one example of a first fixing portion—to be described later) that is a vehicle body side fixing portion, whereby a belt 32 (one example of a belt main body) of the seatbelt 29 can be reeled and stored into the belt reeling portion 33A/33B and can be drawn out of the belt reeling portion 33A/33B. The seatbelt 29 further includes a buckle portion 35A/35B located on the other side of the seat 11/12 in the right-left direction (lateral inner side in the illustrated embodiment). The buckle portion 35A/35B is attached via another stay 30 (one example of a second stay) to another coupling support portion 36a (one example of a second fixing portion—to be described later) that is another vehicle body side fixing portion, whereby an insertion fixture 34 provided at a leading end of the belt 32 drawn out of the belt reeling portion 33A/33B is inserted into the buckle portion 35A/35B and fixed thereto.

Figure 7:
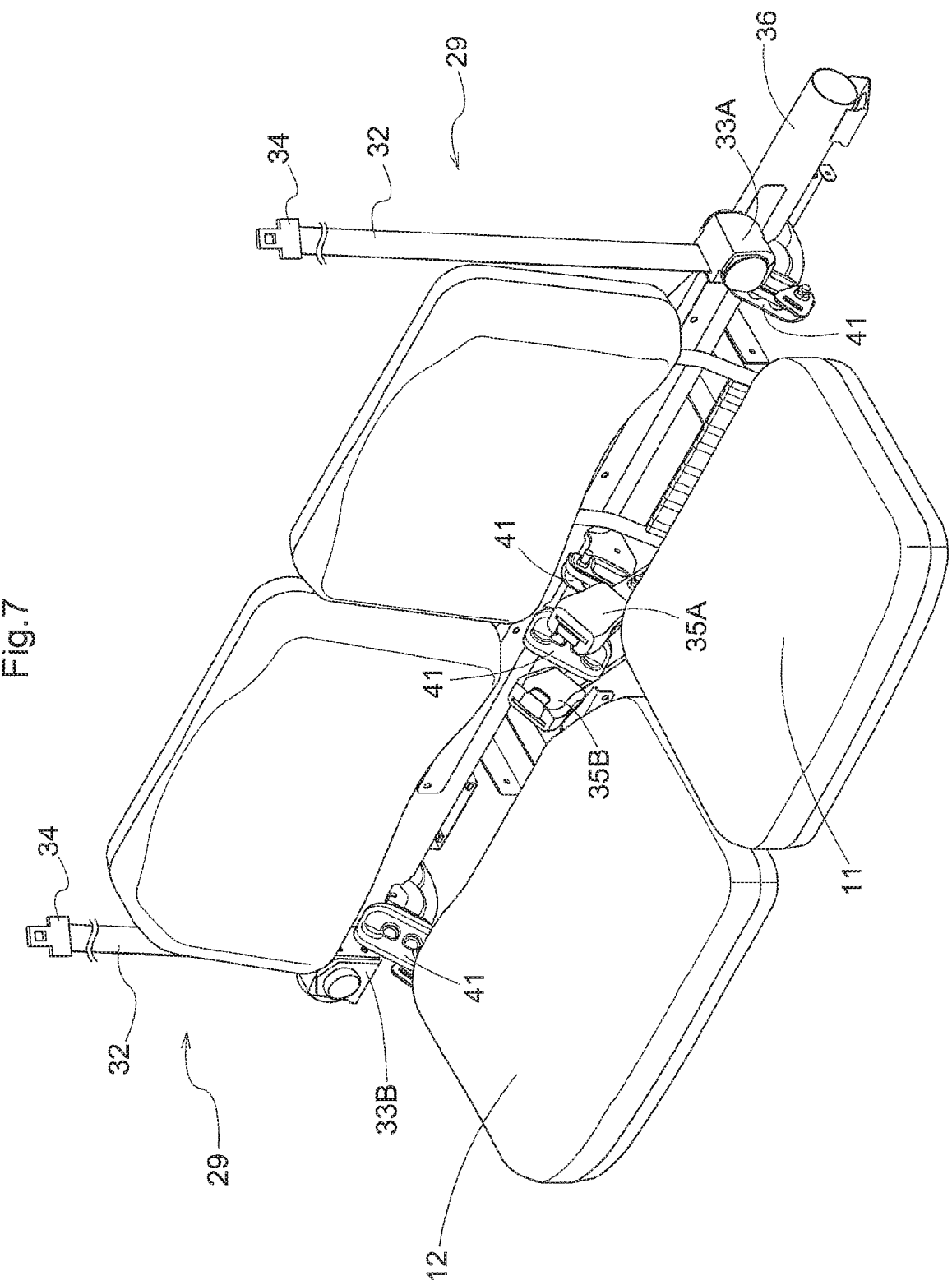
FIG. 7 is a perspective view showing the vicinity of the seatbelt.

More specifically, as shown in FIG. 7, the belt reeling portion 33A for the driver seat 11 is provided on the left side of the driver seat 11, and the buckle portion 35A for the driver seat 11 is provided on the right side of the driver seat 11. On the other hand, the belt reeling portion 33B for the auxiliary seat 12 is provided on the right side of the auxiliary seat 12, and the buckle portion 35B for the auxiliary seat 12 is provided on the left side of the auxiliary seat 12.

In this way, the belt reeling portion 33A for the driver seat 11 and the belt reeling portion 33B for the auxiliary seat 12 are positioned on right/left opposite sides from each other; and the buckle portion 35A for the driver seat 11 and the buckle portion 35B for the auxiliary seat 12 are positioned on right/left opposite sides from each other. Instead thereof, however, both the belt reeling portion 33A for the driver seat 11 and the belt reeling portion 33B for the auxiliary seat 12 may be positioned on a same side (one lateral side) in the right-left direction; and the buckle portion 35A for the driver seat 11 and the buckle portion 35B for the auxiliary seat 12 may be positioned on a same side (the other lateral side) in the right-left direction.

As shown in FIG. 7, each of the belt reeling portion 33A for the driver seat 11 and the belt reeling portion 33B for the auxiliary seat 12 is attached via the stay 30 associated therewith to a lateral frame body 36. Also, the buckle portion 35A for the driver seat 11 and the buckle portion 35B for the auxiliary seat 12 is attached via the stay 30 associated therewith to the lateral frame body 36. Specific descriptions will not be given for the belt reeling portions 33A, 33B or the buckle portions 35A, 35B, since their configurations are well known in the pertinent art.

Figure 4:
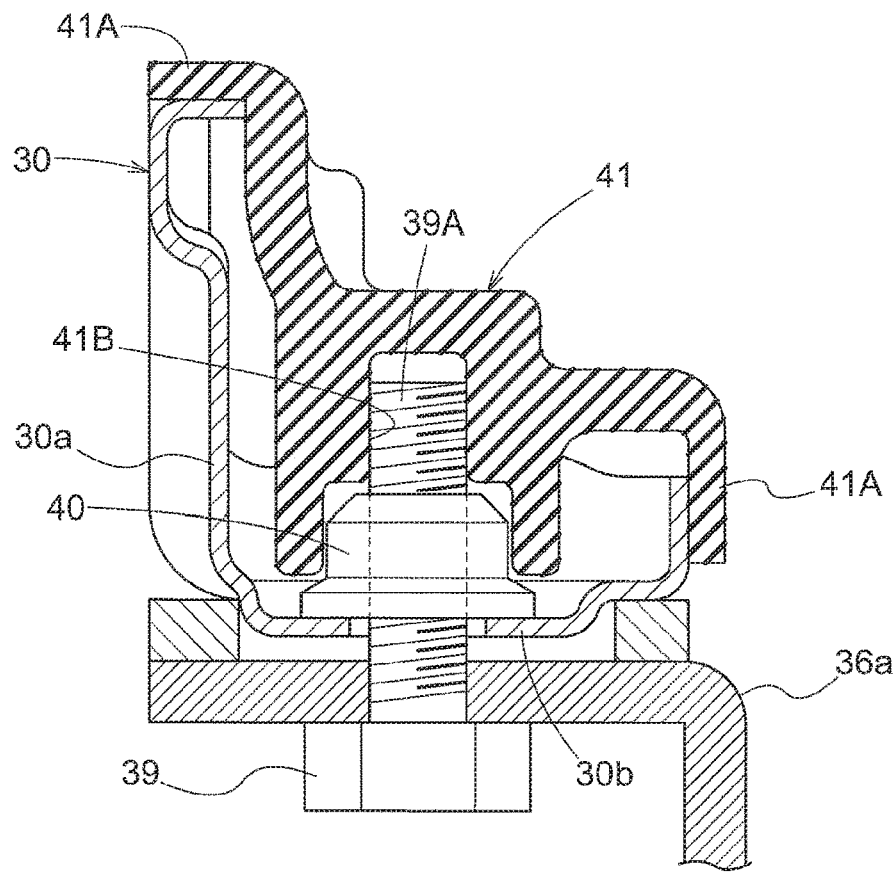
FIG. 4 is a front view in vertical section of a seatbelt attachment portion.
Figure 6:
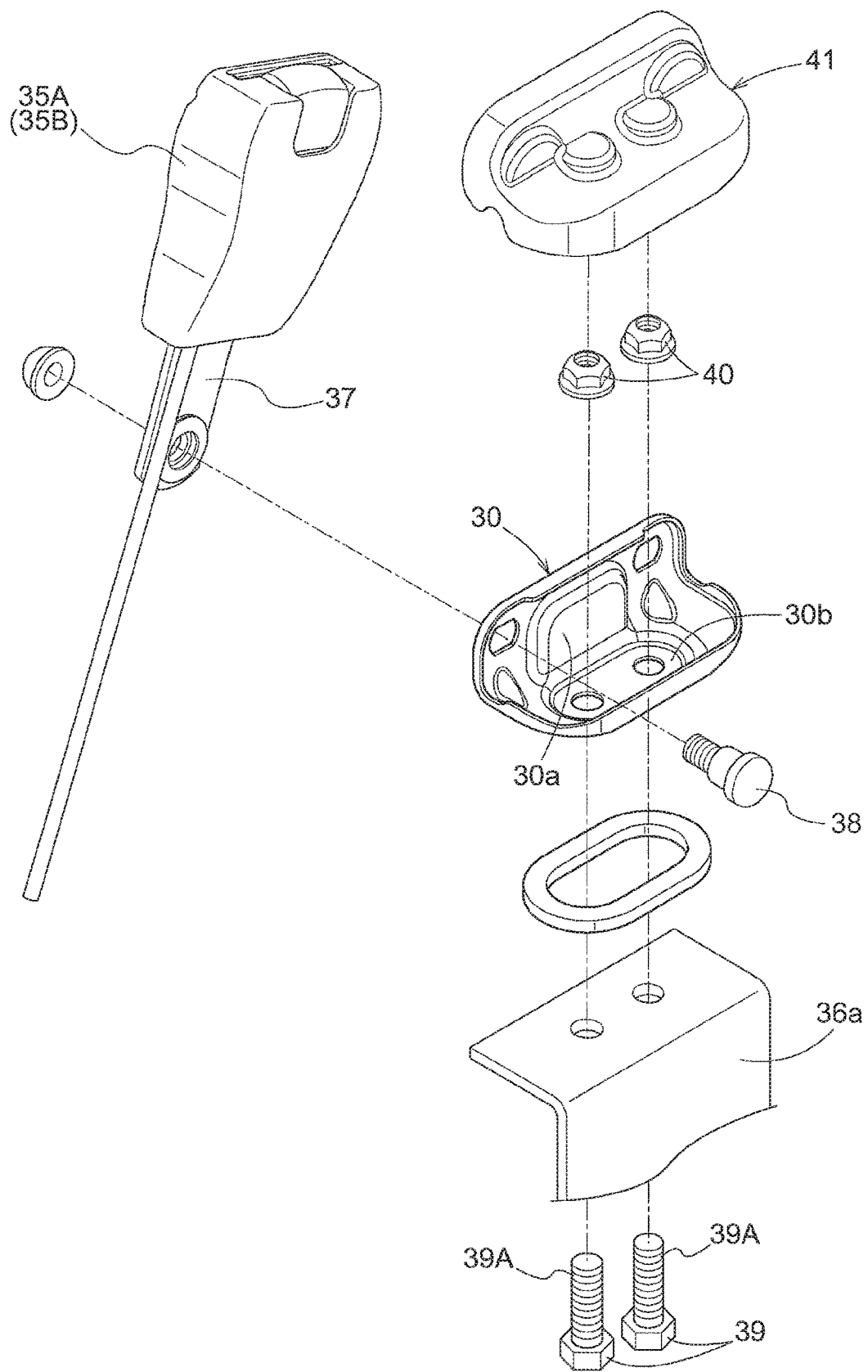
FIG. 6 is an exploded perspective view of the seatbelt attachment portion.

The four (4) stays 30 (i.e. stays 30 for attachment of the right/left belt reeling portions 33A, 33B and the stays 30 for attachment of the right/left buckle portions 35A, 35B) have different attachment orientations, depending on whether the installation position each thereof is on the right side or the left side of the seat. However, each of the four (4) stays 30 has the same shape. Specifically, as shown in FIGS. 4 and 6, each stay 30 looks like a plate body bent into a substantially L-letter shape as seen in the front-rear direction. A coupling plate portion 37 of the buckle portion 35A, 35B or a coupling plate portion (configured similarly with a bolt bore, although not shown) of the belt reeling portion 33A, 33B may be coupled via a bolt 38 to a vertical face portion 30a of the stay 30. A horizontal face portion 30b of the stay 30 may be coupled, via two bolts 39, to the coupling support portion 36a (one example of the first fixing portion or the second fixing portion) that is integrally fixed to and extends from the lateral frame body 36. Each bolt 39 for coupling with the coupling support portion 36a is vertically oriented and attached from the lower surface side such that a leading end portion of the bolt 39 faces upward; and fastened and fixed by a nut 40 that is located on the upper side of the horizontal face portion 30b of the stay 30.

Figure 5:
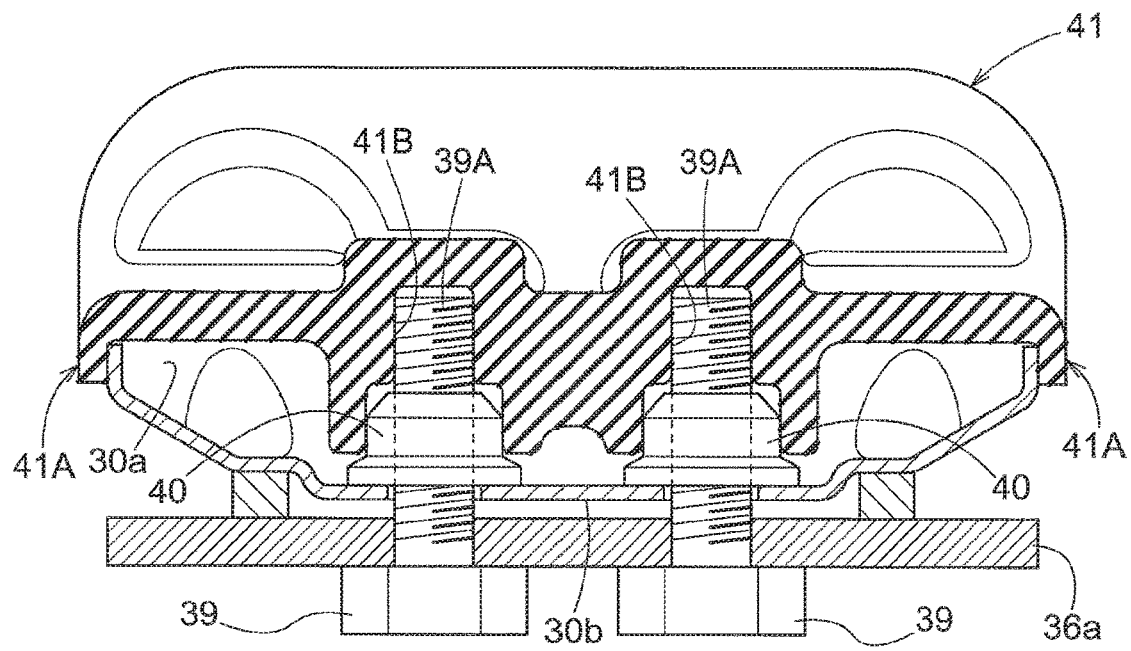
FIG. 5 is a side view in vertical section of the seatbelt attachment portion.

As shown in FIGS. 4 to 6, a peripheral edge portion each of the vertical face portion 30a and the horizontal face portion 30b of the stay 30 is bent to one side in form of an approximately L-letter (substantially at right angles). This configuration may improve the support strength of the stay 30 while a plate thickness of the stay 30 is made small.

As shown in FIGS. 4 to 6, a cover member 41 (one example of a first cover member or a second cover member) is attached to each of the four (4) stays 30 to cover an outward exposed portion. Each of the four (4) cover members 41 is configured with the same shape. Further, each cover member 41 is formed of a rubber material (one example of an elastic material) into a one-piece mold product.

The cover member 41 is profiled with an approximately L-letter shape shape as seen along the front-rear direction to extend substantially along the outer shape of the stay 30 in order to cover the outward exposed portion each of the vertical face portion 30a and the horizontal face portion 30b of the stay 30. As shown in FIGS. 4 and 5, the cover member 41 has a cover portion 41A provided on an outer peripheral portion thereof. The cover portion 41A is configured to cover an outer edge each of the vertical face portion 30a and the horizontal face portion 30b of the stay 30, and to overlap in tight contact with those outer edges to prevent intrusion of moisture, dust and the like.

As shown in FIGS. 4 and 5, when the bolt 39 is coupled to the lateral frame body 36, the leading end portion thereof protrudes upward beyond the nuts 40. The cover member 41 includes a cylindrical portion 41B configured to fit around the upwardly protruding portion 39A of the bolt 39 associated therewith. The cylindrical portion 41B is formed of a rubber material similarly to the remainder of the cover member 41. The upper end portion of the cylindrical portion 41B is closed.

The cover member 41 is held in position by the cylindrical portions 41B and the bolts 39 being press-fitted by elastic force. Specifically, each cylindrical portion 41B is formed at a position aligned the bolt 39 associated therewith when the cover member 41 is properly attached to the stay 30. Each cylindrical portion 41B has an inner diameter thereof slightly smaller than an outer diameter of the protruding portion 39A of the bolt 39. When the cover member 41 is to be attached to the stay 30, each bolt 39 is fitted into the cylindrical portion 41B while the cylindrical portion 41B undergoes elastic deformation. After the attachment, the cover member 41 is held in position by the cylindrical portions 41B and the bolts 39 being press-fitted by elastic force. According to this configuration, there is no need for a special coupling member for attaching the cover member 41, and the cover member 41 remains being held in position with a simple configuration.

Figure 8:
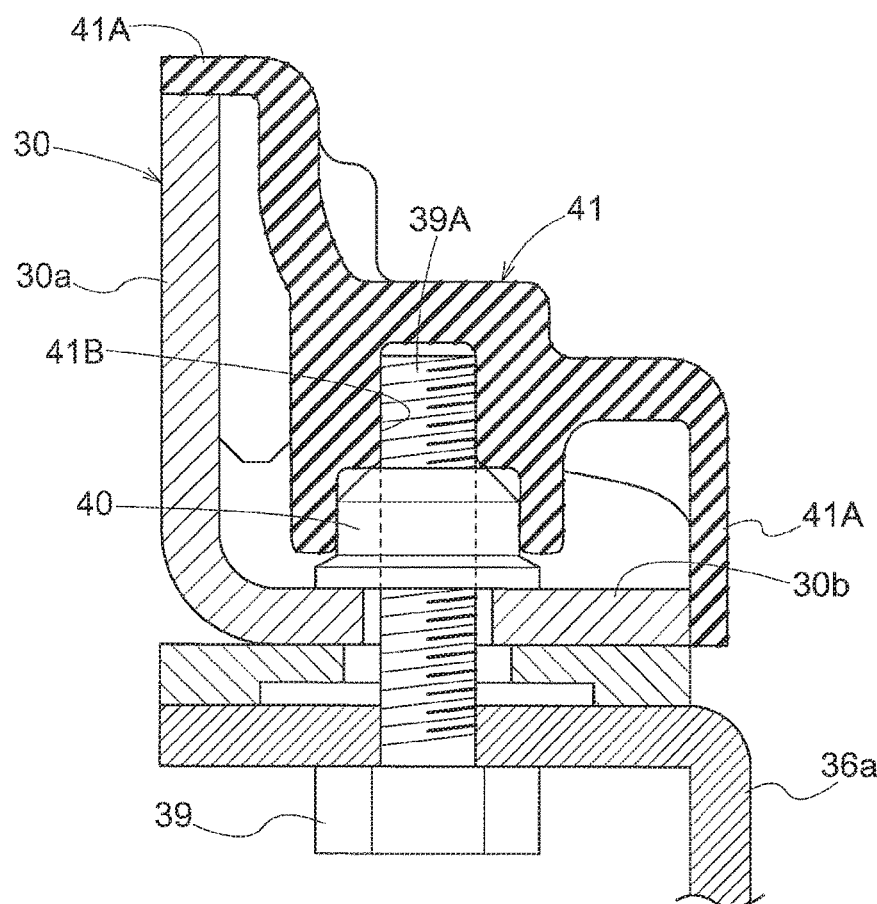
FIG. 8 is a front view in vertical section of the seatbelt attachment portion according to a modified embodiment.
Figure 9:
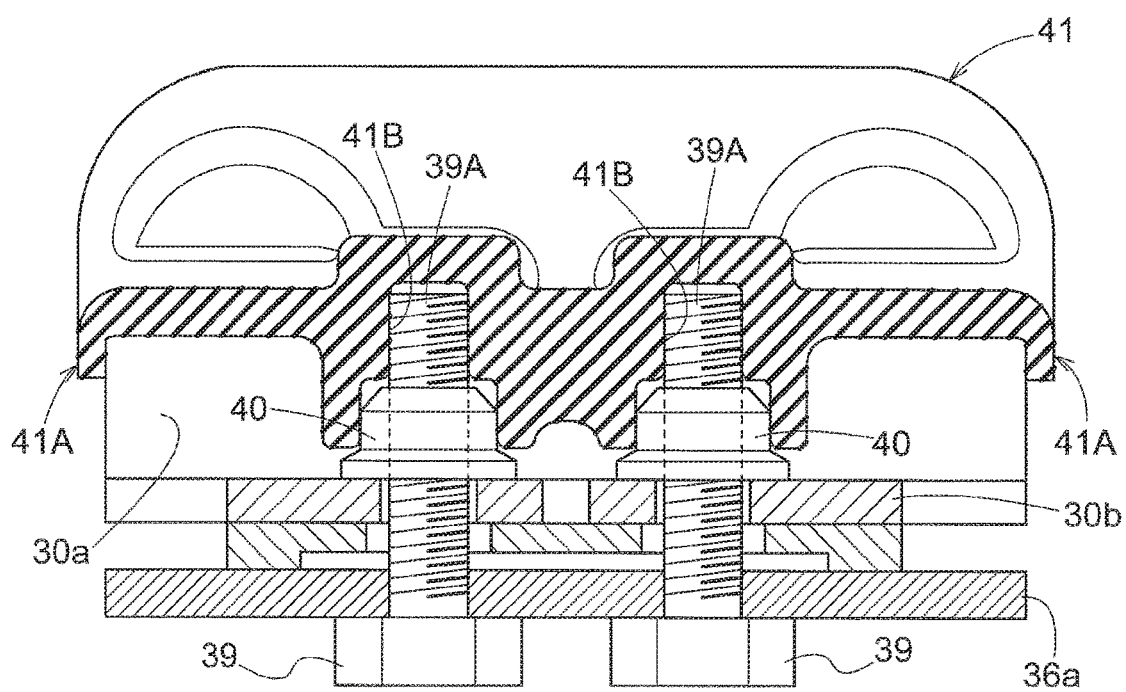
FIG. 9 is a side view in vertical section of the seatbelt attachment portion according to the modified embodiment.
Figure 10:
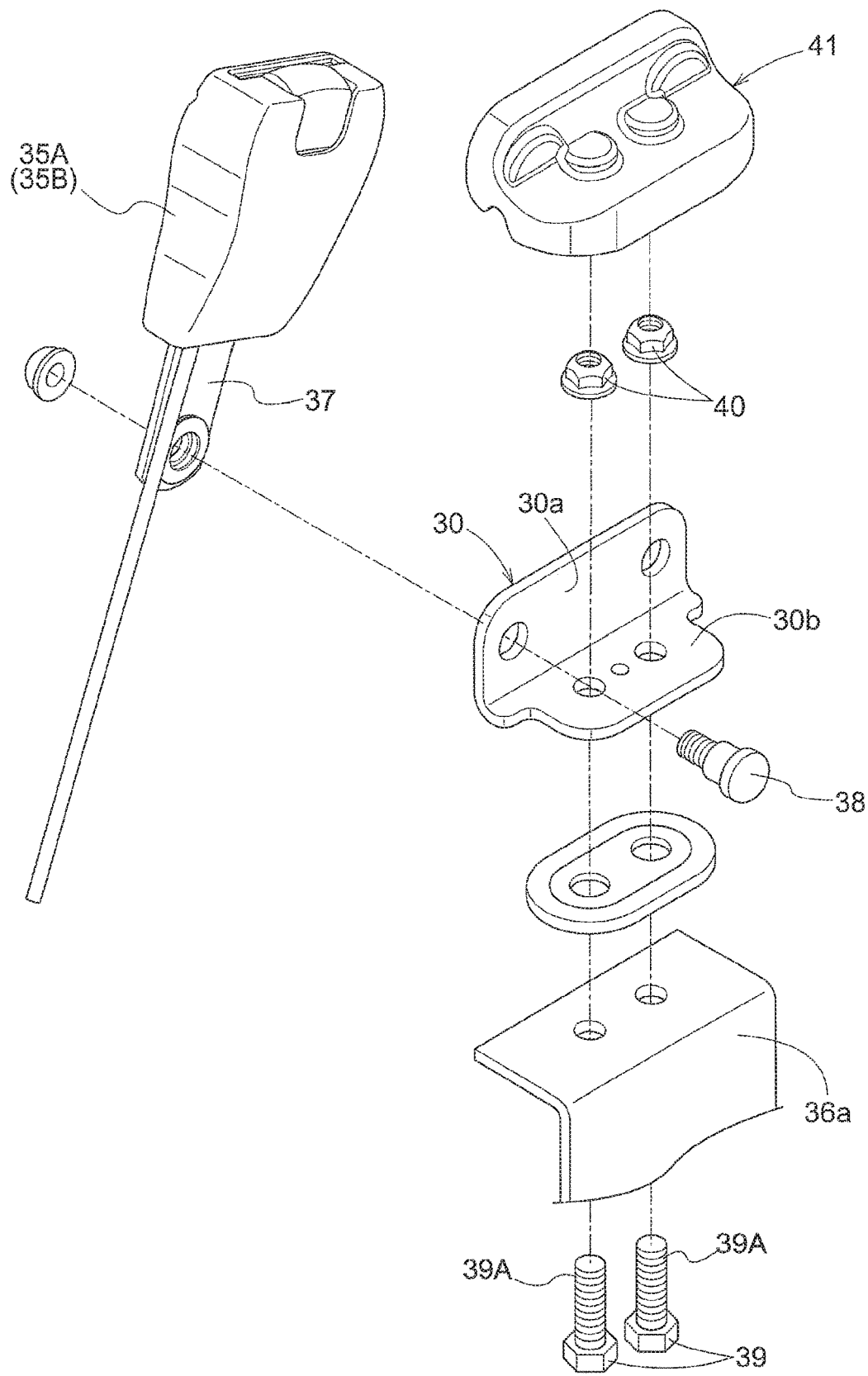
FIG. 10 is an exploded perspective view of the seatbelt attachment portion according to the modified embodiment.

Modified Embodiments of First Embodiment (1) In the foregoing embodiment, the stay 30 has the peripheral edge portion thereof bent to one side in form of an approximately L-letter (substantially at right angles), but this is not limitative. Alternatively, as shown in FIGS. 8 to 10, the stay 30 may be a plate body with a larger plate thickness and simply curved so as to be approximately L-shaped.

(2) In the foregoing embodiment, the cover member 41 is made of an elastic material and is held in position by the integrally-formed cylindrical portions 41B and the bolts 39 being press-fitted together, but this is not limitative. Alternatively, the cover member 41 may be held in position by fixing the cover member 41 by screws at locations not visible from the outside or otherwise; and the positioning structure can be changed as desired. Still alternatively, the cover member 41 may be formed of a metal material, a hard resin material or the like.

(3) In the foregoing embodiment, the stays 30 for attachment of the belt reeling portions 33A, 33B and the stays 30 for attachment of the buckle portions 35A, 35B are configured with the same shape, and the cover members 41 are configured with the same shape, but this is not limitative. Alternatively, the stays for attachment of the belt reeling portions 33A, 33B and the stays for attachment of the buckle portions 35A, 35B may have different shapes from each other; and accordingly the cover members for the belt reeling portions 33A, 33B and the cover members for the buckle portions 35A, 35B may have different shapes from each other.

(4) In the foregoing embodiment, two seats, namely the driver seat 11 and the auxiliary seat 12, are provided, but this is not limitative. Alternatively, only the driver seat 11 may be provided, or the work vehicle may be of a four-passenger type in which two auxiliary seats are provided in the rear portion of the vehicle body in addition to the auxiliary seat 12 that is adjacent to the driver seat 11. Still alternatively, the number of auxiliary seats may be two, or four or more.

(5) In the foregoing embodiment, a multipurpose vehicle (utility vehicle) is described as an example of the work vehicle, but this is not limitative. Other than a multipurpose vehicle, the present invention is applicable to various types of work vehicles such as a tractor or a rice planter.

Second Embodiment

Next, a second embodiment will be described with reference to FIGS. 11 to 16. In this embodiment as well, a multipurpose work vehicle is described as an example of a work vehicle.

Overall Configuration

Figure 11:
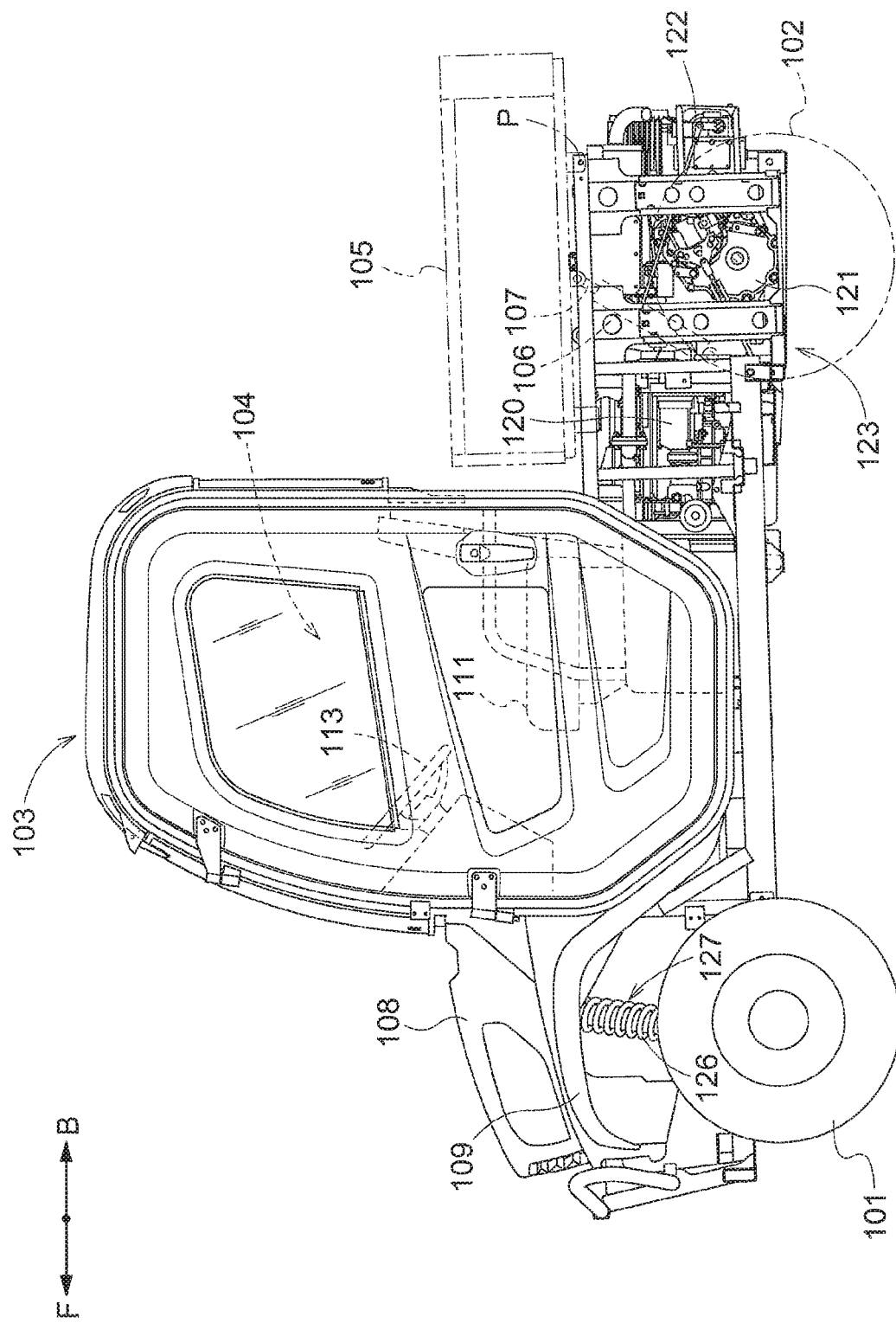
FIG. 11 is a view according to a second embodiment (the same follows up to FIG. 16), showing a lateral side of a work vehicle in its entirety.
Figure 12:
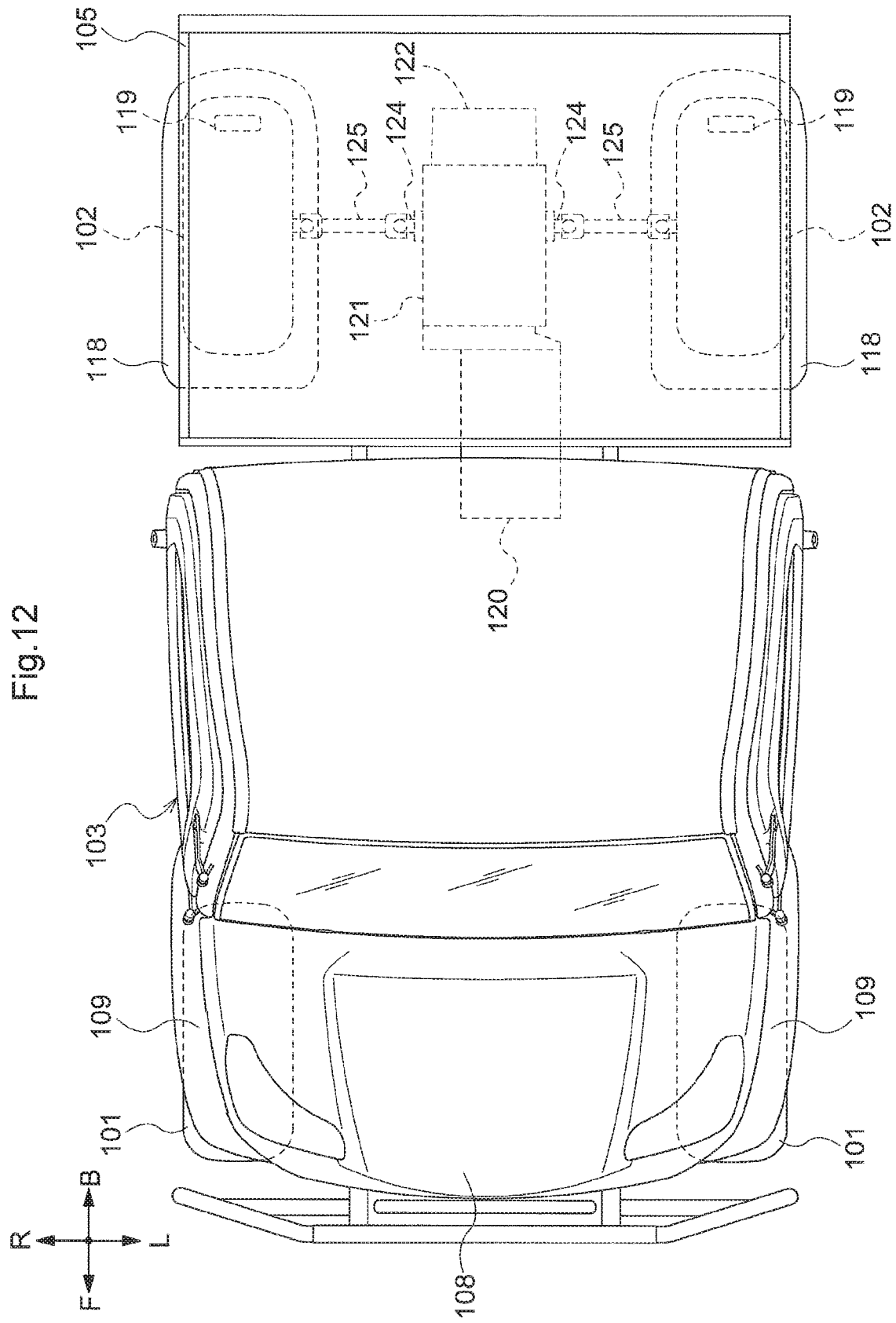
FIG. 12 is an overall plan view of the work vehicle.
Figure 13:
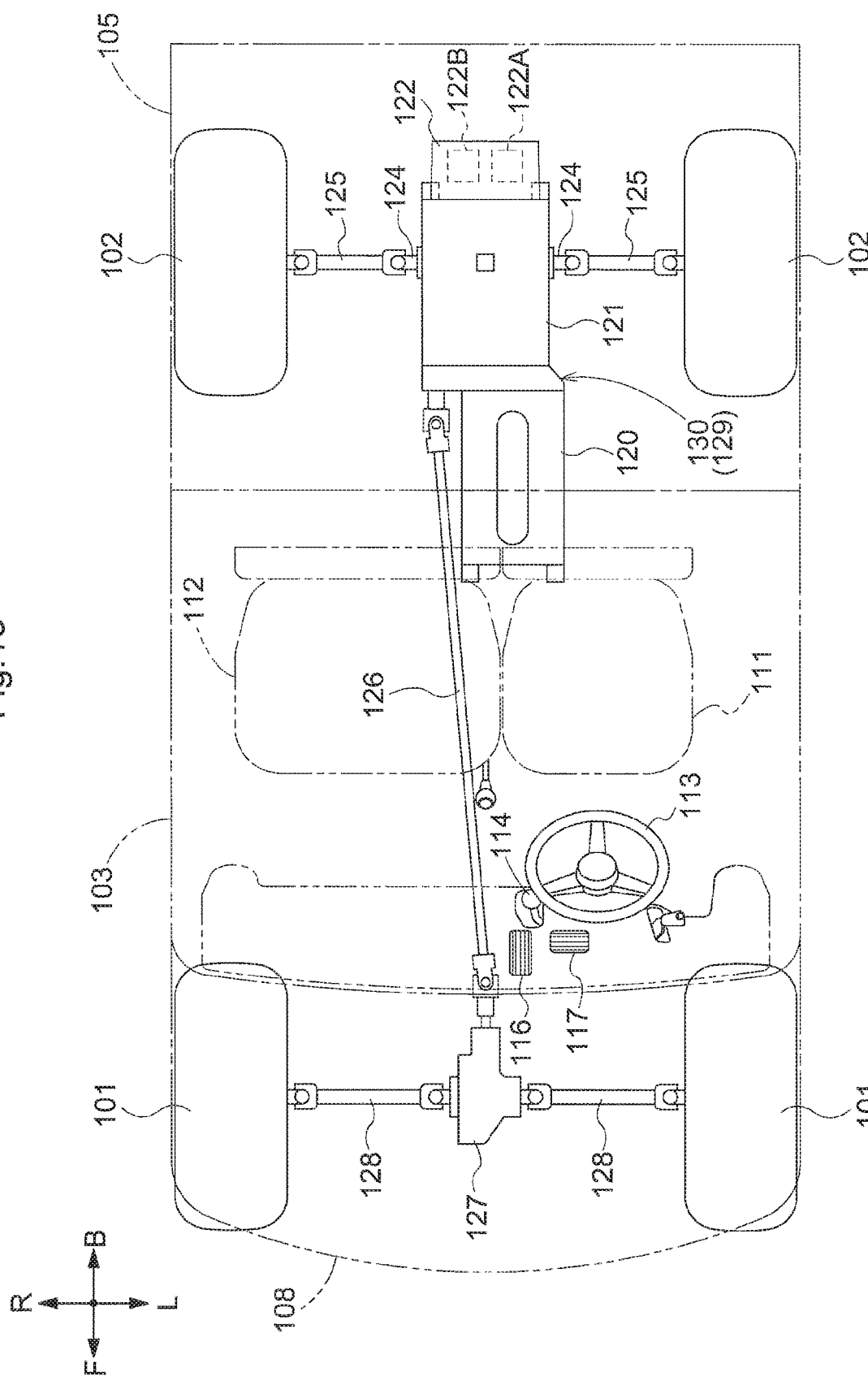
FIG. 13 is a plan view showing a transmission system of the work vehicle.

As shown in FIGS. 11 to 13, the work vehicle has a configuration including a pair of right/left front wheels 101 that are steerable; a pair of right/left rear wheels 102; a driver portion 104 that is located in the front portion of the vehicle body and is covered by a cabin 103; a loading platform 105 that is located in the rear portion of the vehicle body; a drive portion 106 that is located below the loading platform 105, etc.

This work vehicle is a four-wheel drive type of vehicle that has a traveling drive system for transmitting drive power from the drive portion 106 to the front wheels 101 and the rear wheels 102, and is configured as a utility vehicle that can be applied to various uses, such as cargo transport or recreation. The loading platform 105 is supported such that the rear end side is capable of swinging about an axis P that is oriented in the lateral direction at a rear end position of the vehicle body, and has a configuration in which the front end side can be raised by the operation of a dump cylinder 107 so as to discharge a load rearward. A hood 108 that can be opened and closed is provided in the front portion of the vehicle body, and front fenders 109 that cover the upper sides of the front wheels 101 are arranged at lower right/left portions of the hood 108.

The driver portion 104 includes a driver seat 111 on which the driver sits, and an auxiliary seat 112 that is provided at a position adjacent to the driver seat 111. Also, a steering wheel 113 for steering and controlling the front wheels 101, a main gearshift lever 114, etc. are provided at positions in front of the driver seat 111; and at positions downwardly thereof, there are provided an accelerator pedal 116, which serves as a gear shift operating tool for controlling the travelling speed, and a brake pedal 117 (see FIG. 13), which controls a brake apparatus (not shown) for braking the front wheels 101 and the rear wheels 102. Rear fenders 118 that cover the upper side of the right/left rear wheels 102 are provided at the rear end side of the vehicle body, and brake lamps 119 are provided in the rear fenders 118 (see FIG. 12).

Drive Portion

As shown in FIG. 11, the drive portion 106 has a configuration in which an engine 120, a transmission case 121 and a hydrostatic stepless transmission (be referred to as "HST 122" below) are integrally coupled in the stated order. Although a specific description will not be given for the drive portion 106, the drive portion 106 is installed and supported using a frame-shaped vehicle body frame 123 in a state in which vibration is prevented or suppressed from being transmitted to the driver portion 104.

Although the internal structure of the transmission case 121 is not shown in the drawings, the transmission case 121 includes a gear-type of transmission apparatus that is configured to shift the drive power, that has been shifted by the stepless transmission 122, to one of multiple gears, and also configured to switch the drive power between the forward travelling power and the rearward travelling power. The transmission case 121 further includes a rear wheel differential mechanism (not shown).

As shown in FIG. 13, the stepless transmission 122 includes an axial plunger type of variable displacement hydraulic pump 122A that is operated by drive power from the engine 120, and an axial plunger type of hydraulic motor 122B that is rotated by hydraulic fluid supplied from the hydraulic pump 122A.

In the drive portion 106, the engine 120 has an output shaft thereof (crankshaft, not shown) oriented along the front-rear direction. The transmission system thereof has a transmission shaft (not shown), coupled to the output shaft, extending through the transmission case 121 in the front-rear direction, whereby the drive power from the engine 120 is transmitted to the hydraulic pump 122A of the stepless transmission 122, and the drive power from the hydraulic motor 122B of the stepless transmission 122 is transmitted to the transmission case 121.

In the transmission case 121, the transmitted drive power is shifted by the transmission apparatus, and the shifted power is transmitted to the right/left rear wheels 102 via the rear wheel differential mechanism, right/left rear output shafts 124 and right/left rear wheel drive shafts 125; and as shown in FIG. 13, the shifted power is transmitted also to the right/left front wheels 101 via a lower output shaft (not shown) formed on the lower surface side, a front-to-rear shaft 126 that extends forward from the lower output shaft, a front wheel differential mechanism 127 and front wheel drive shafts 128.

Figure 14:
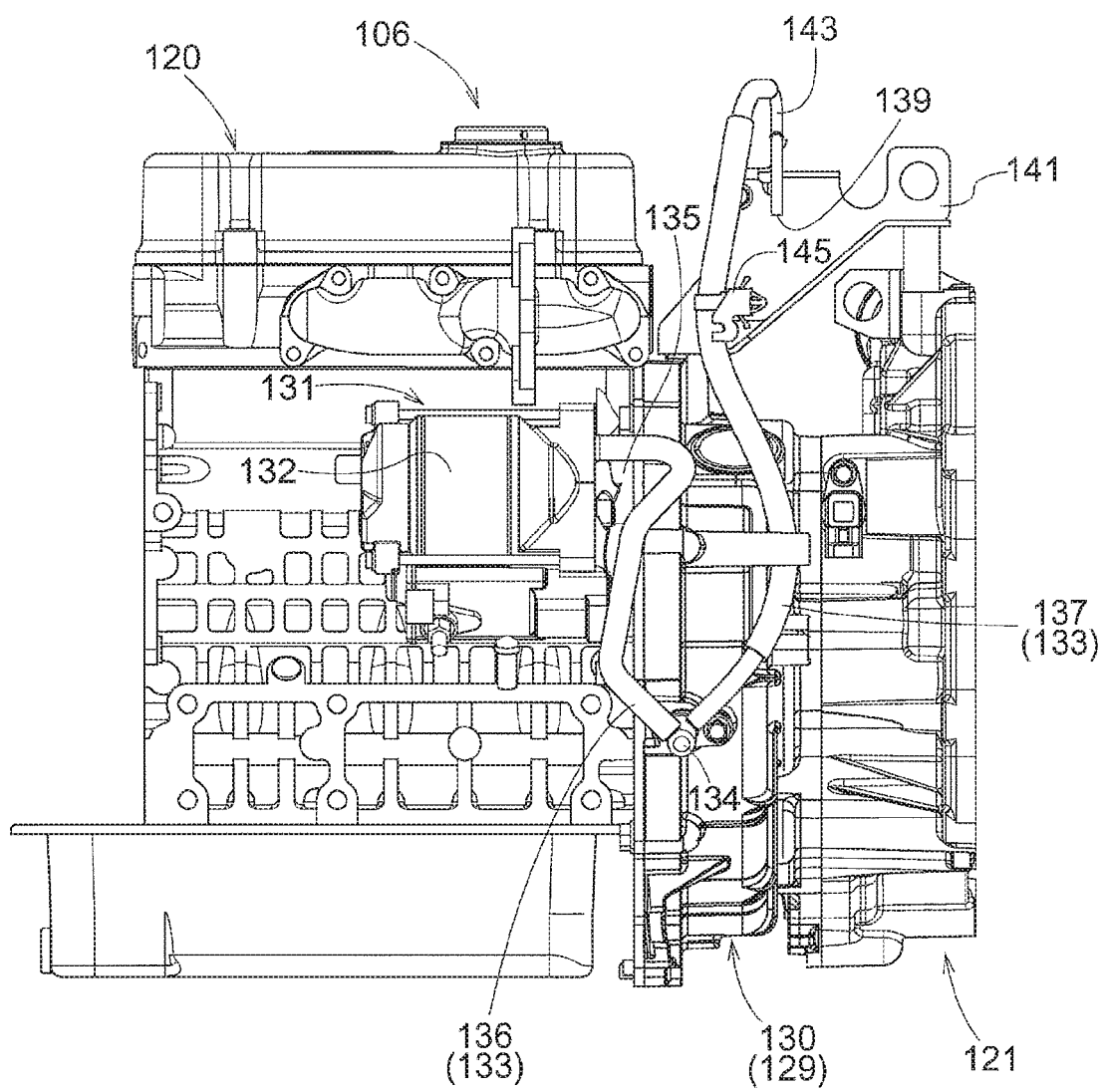
FIG. 14 is a side view of a coupling portion between an engine and a transmission case.
Figure 15:
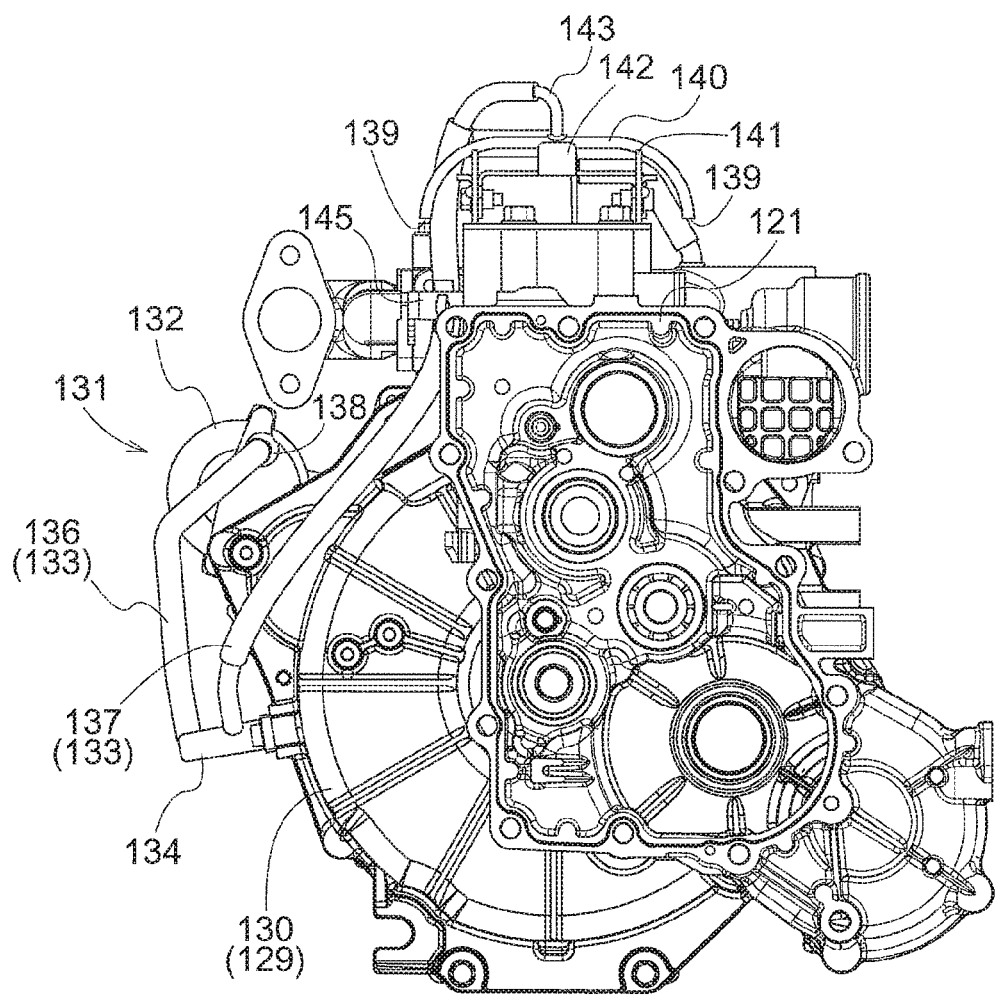
FIG. 15 is a rear view in vertical section of the coupling portion between the engine and the transmission case.
Figure 16:
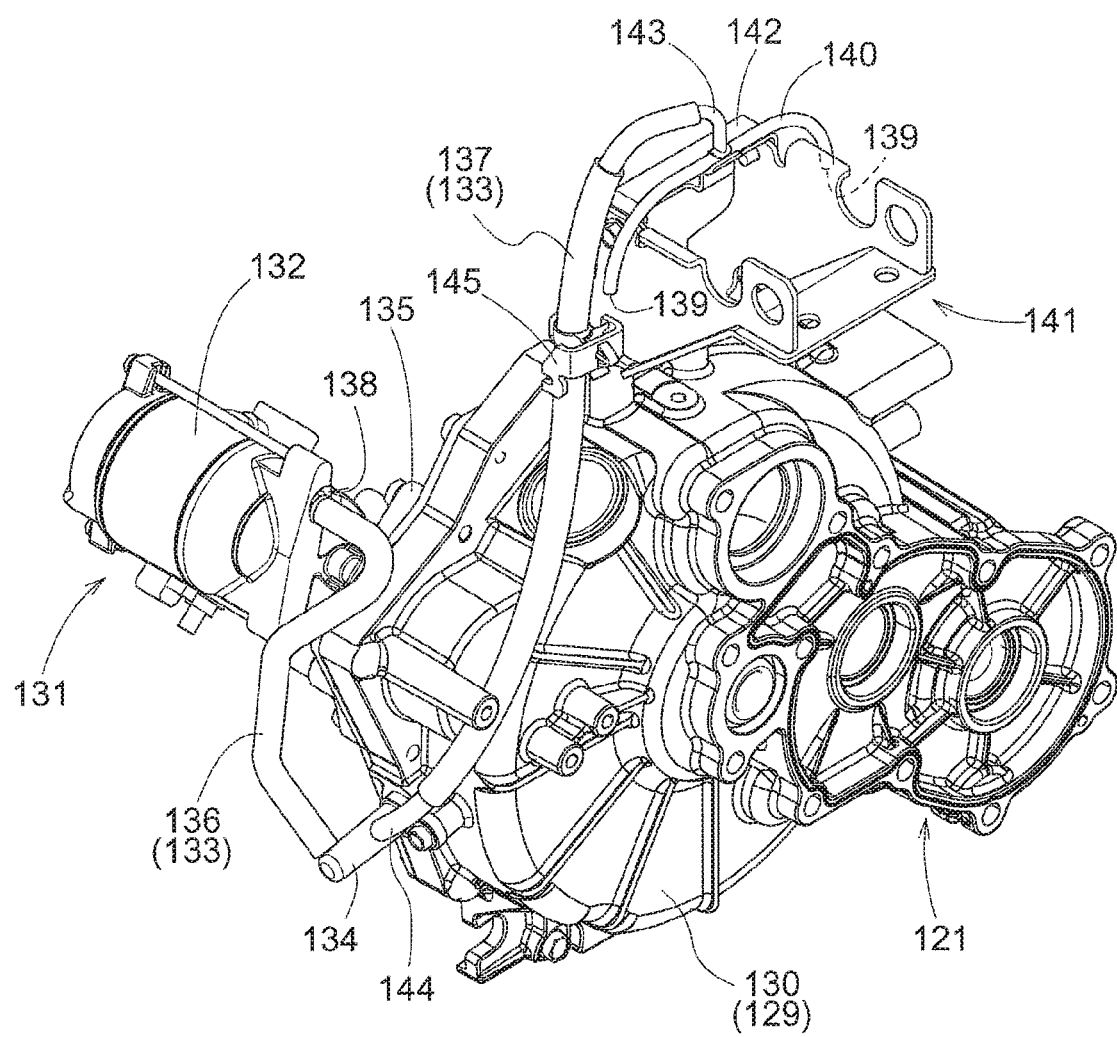
FIG. 16 is a perspective view of the coupling portion between the engine and the transmission case.

A flywheel 129 is integrally-rotatably provided on the output shaft of the engine 120 at a location between the engine 120 and the transmission case 121. As shown in FIGS. 14 to 16, the flywheel 129 is covered in an airtight manner by a flywheel case 130.

Starter Air Bleeding Structure

As shown in FIGS. 14 to 16, a starter 131 is provided in the vicinity of the engine 120 for starting up the engine 120; and the starter 131 is surrounded by a starter case 132. Although the configuration of the starter 131 is well known in the pertinent art and thus it is not shown in detail, the starter 131 includes: an electric motor; a pinion gear that is driven to rotate by the electric motor; and an actuator such as a solenoid that enables the pinion gear to perform an extending and retracting operation between a retracted position in which the pinion gear is retracted inside the starter case 132, and a projecting position in which the pinion gear projects outward from the starter case 132 to be meshed with a ring gear provided on the outer peripheral portion of the flywheel 129. Since the starter 131 includes an electrical device such as the electric motor as described above, it is necessary to avoid intrusion of moisture into the starter 131.

Note that each of FIGS. 14 to 16 shows the transmission case 121 that is cut at a front-rear intermediate portion thereof in order to facilitate understanding of the air bleeding structure of the starter 131.

The pinion gear extends from and retracts into the starter case 132 by the operation of the actuator to be switched between the state of being meshed with the ring gear and the state of not being meshed with the ring gear. If the starter case 132 is made airtight, the atmospheric pressure in the starter case 132 sometimes decreases (becomes a negative pressure) in association with the retracting of the pinion gear, whereby extending and retracting operations of the pinion gear cannot be performed smoothly. In order to avoid the intrusion of moisture from outside while securing smooth extending and retraction operations of the pinion gear, an air bleeding tube 133 is provided to put the space inside the starter case 132 into communication with an outward space having less risk of moisture intrusion.

The air bleeding tube 133 is provided in communication with the outward space via a joint connector 134 that is in communication with the interior space of the flywheel case 130. The joint connector 134 has an approximately cylindrical shape, and is attached so as to extend outward in a direction orthogonal to the outer face of the flywheel case 130. The joint connector 134 has a base-side end portion that is open, and an extending-side end portion that is closed. The joint connector 134 is attached to the outer face of the flywheel case 130 at a lower position of the flywheel case 130, and the base-side end portion is in communication with the interior space of the flywheel case 130. The joint connector 134 is located at a level lower than the starter 131.

The starter 131 is flange-connected to the flywheel case 130 at a position on a left lateral side of the engine 120. In more specific, a flange portion 135 is provided on the rear portion (portion closer to the flywheel 129) of the starter case 132, and the flange portion 135 is bolt-coupled to a side face on the front portion (portion closer to the engine 120) of the flywheel case 130. An opening (not shown) is formed in the front side of the flywheel case 130 for allowing passage of the pinion gear.

The air bleeding tube 133 includes a first tube portion 136 that extends from a position on the rear side of the starter case 132 to the joint connector 134, and a second tube portion 137 that extends from the joint connector 134 to a position above the transmission case 121.

In more specific, the first tube portion 136 extends from an opening portion 138 that is defined in the rear side of the starter case 132 to the outer end portion of the joint connector 134. The first tube portion 136 extends substantially along the up-down direction, wherein one end portion of the first tube portion 136 closer to the starter case 132 is located on the upper side, and the other end portion of the first tube portion 136 closer to the joint connector 134 is located on the lower side.

On the other hand, the second tube portion 137 extends from an intermediate portion of the joint connector 134 toward outside air opening portions 139 that are located at positions above the transmission case 121. The second tube portion 137 extends substantially along the up-down direction, wherein one the end portion of the second tube portion 137 closer to the joint connector 134 is located on the lower side, and the other end portion of the second tube portion 137 closer to the outside air opening portions 139 is located on the upper side.

A branch tube 140 is connected to the second tube portion 137 of the air bleeding tube 133 at a portion of the second tube portion 137 adjacent to the outside air opening portions 139. The branch tube 140 extends substantially along the horizontal direction, and the outside air opening portions 139 are formed in opposite end portions of the branch tube 140. Opposite end portion of the branch tube 140 are bent to gradually curve downward from a horizontally oriented portion of the branch tube 140. The outside air opening portions 139 formed in the two end portions are open to face downward.

The branch tube 140 is supported by a support member 141 that is fixed to an upper portion of the transmission case 121 and that is formed in an approximate U-letter as viewed along the front-rear direction. In more specific, a bracket 142 is attached to the support member 141 such that the bracket 142 extends between right/left vertical face portions 141a of the support member 141 to be supported by the right/left vertical face portions 141a, whereby an intermediate portion of the branch tube 140 extending in the horizontal direction is integrally coupled to and supported by the bracket 142. Although not shown, the support member 141 is a member for supporting a relay speed change operation mechanism that provides a link between the accelerator pedal 116 and the speed change operation tool of the HST 122.

Each of the branch tube 140, a central tube 143 connected thereto and the bracket 142 is formed of a metal material. Also, each of the joint connector 134 and a connection tube portion 144 is formed of a metal material. On the other hand, the first tube portion 136, which connects the starter case 132 to a tube portion (not shown) of the joint connector 134, is formed of a rubber tube; and the second tube portion 137, which connects the tube portion 144 and the central tube 143 of the joint connector 134, is formed of a rubber tube as well.

An intermediate portion of the second tube portion 137 in the up-down direction is held in position by a holding tool 145 that is fixed to the support member 141.

Modified Embodiments of Second Embodiment (1) In the foregoing embodiment, the joint connector 134 is in communication with the interior space at a position on the lower portion of the flywheel case 130, but this is not limitative. Alternatively, the joint connector 134 may be in communication with the interior space at a position on the upper portion of the flywheel case 130. Still alternatively, the joint connector 134 may be in communication with the interior space of the transmission case 121 instead of the flywheel case 130. In this case, the joint connector 134 may be in communication with the interior space at a position on the lower portion of the transmission case 121, or in communication with the interior space at a position on the upper portion of the transmission case 121.

(2) In the foregoing embodiment, the outside air opening portions 139 of the air bleeding tube 133 are provided at a position above the transmission case 121, but this is not limitative. Alternatively, the outside air opening portions 139 may be provided at a position above the engine 120.

(3) In the foregoing embodiment, the branch tube 140 that extends approximately in the horizontal direction is connected to the air bleeding tube 133 at a position adjacent to the outside air opening portions 139; and a total of two outside air opening portions 139 are formed at respective end portions of the branch tube 140, but this is not limitative. Alternatively, the branch tube 140 may be omitted; and instead one end portion of the air bleeding tube 133 may be opened to provide a single outside air opening portion 139. Still alternatively a plurality of branch tubes may be provided to form three (3) or more outside air opening portions 139.

(4) In the foregoing embodiment, each outside air opening portion 139 is open to face downward, but this is not limitative. Alternatively, the outside air opening portion 139 may be open to face horizontally. Still alternatively, the outside air opening portion 139 may be open to face upward if a cover is provided above the outside air opening portion 139.

(5) In the foregoing embodiment, the engine 120 and the transmission case 121 are integrally coupled to each other, but this is not limitative. Alternatively, the engine 120 and the transmission case 121 may be separated from each other and individually supported by a frame.

(6) In the foregoing embodiment, a multipurpose vehicle (utility vehicle) is described as an example of the work vehicle, but this is not limitative. Other than a multipurpose vehicle, the present invention is applicable to various types of work vehicles such as a tractor or a rice planter.

What is claimed is:

1. A work vehicle comprising:
   an engine;
   a transmission case;
   a flywheel case provided between the engine and the transmission case, the flywheel case being configured to cover the flywheel in an airtight manner;
   a starter case configured to cover an electric motor starter that is configured for starting up the engine;
   an air bleeding tube configured to put an interior of the starter case in communication with an outward space; and
   a joint connector configured to communicate with an interior space of the flywheel case or the transmission case, the air bleeding tube being communicated with the outward space via the joint connector.

2. The work vehicle according to claim 1, wherein
   the joint connector communicates with the interior space at a lower portion of the flywheel case or the transmission case, and
   the air bleeding tube includes an outside air opening portion at a position above the engine or the transmission case to communicate with the outward space.

3. The work vehicle according to claim 2, wherein
   a branch tube is connected to the air bleeding tube at a position associated with the outside air opening portion side, and
   the branch tube extends approximately along a horizontal direction, and the outside air opening portion is formed in each of opposite end portions of the branch tube.

4. The work vehicle according to claim 2, wherein the outside air opening portion is open facing downward.

\* \* \* \* \*